(12) United States Patent
Shih et al.

(10) Patent No.: US 9,599,848 B2
(45) Date of Patent: Mar. 21, 2017

(54) DISPLAY DEVICE INCLUDING COMPENSATION CAPACITORS WITH DIFFERENT CAPACITANCE VALUES

(71) Applicant: INNOLUX CORPORATION, Miao-Li County (TW)

(72) Inventors: Po-Sheng Shih, Miao-Li County (TW); Po-Yang Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/301,489

(22) Filed: Jun. 11, 2014

(65) Prior Publication Data

US 2014/0293166 A1    Oct. 2, 2014

Related U.S. Application Data

(63) Continuation of application No. 12/916,641, filed on Nov. 1, 2010, now Pat. No. 8,804,058.

(51) Int. Cl.
| | | |
|---|---|---|
| G02F 1/1343 | (2006.01) | |
| G02F 1/1333 | (2006.01) | |
| G06F 3/041 | (2006.01) | |
| G02F 1/1362 | (2006.01) | |
| G02F 1/1368 | (2006.01) | |

(52) U.S. Cl.
CPC ........ G02F 1/13338 (2013.01); G02F 1/1368 (2013.01); G02F 1/134309 (2013.01); G02F 1/136213 (2013.01); G06F 3/0412 (2013.01); G02F 2001/134345 (2013.01)

(58) Field of Classification Search
CPC .......... G02F 1/13338; G02F 1/134309; G02F 1/136213; G02F 1/1368; G02F 2001/134345; G06F 3/0412
USPC ..................................... 349/38–39
See application file for complete search history.

(56) References Cited

U.S. PATENT DOCUMENTS

| | | | |
|---|---|---|---|
| 8,804,058 B2* | 8/2014 | Shih et al. ................ 349/38 |
| 2003/0098934 A1* | 5/2003 | Lee ................... G02F 1/136213 349/39 |
| 2005/0052590 A1* | 3/2005 | Ochiai ................. G02B 6/0068 349/71 |
| 2010/0315377 A1* | 12/2010 | Chang ................... G06F 3/0386 345/175 |
| 2012/0242610 A1* | 9/2012 | Yasumatsu ............. G06F 3/045 345/173 |

\* cited by examiner

*Primary Examiner* — Charles Chang
(74) *Attorney, Agent, or Firm* — Li & Cai Intellectual Property (USA) Office

(57) ABSTRACT

An exemplary display device providing touch function includes scanning lines and data lines thereby defining lots of sub-pixel units. Each sub-pixel unit includes a pixel electrode, a storage capacitor, a compensation capacitor connected between the pixel electrode and a corresponding scanning line. In each pixel unit defined by n number adjacent sub-pixel units, both of a ratio of capacitance values between the storage capacitors formed in the corresponding sub-pixel units and a ratio of capacitance values between the corresponding compensation capacitors are respectively substantially equal to a ratio of areas between the corresponding pixel electrodes.

19 Claims, 3 Drawing Sheets

DISPLAY DEVICE INCLUDING COMPENSATION CAPACITORS WITH DIFFERENT CAPACITANCE VALUES

CROSS REFERENCE TO RELATED APPLICATION

This application is a continuation of U.S. application Ser. No. 12/916,614 filed on Nov. 1, 2010 and entitled "DISPLAY DEVICE INCLUDING COMPENSATION CAPACITORS WITH DIFFERENT CAPACITANCE VALUES", now in condition for allowance.

BACKGROUND

1. Technical Field

The present disclosure relates to display devices, and more particularly to a touch-enabled display device.

2. Description of Related Art

Various types of flat display panels, such as a plasma display panel (PDP), a liquid crystal display (LCD) panel, an organic light emitting diode (OLED) display panel and others, are commonly used with compact electronic apparatuses. Such flat display panels are very thin, provide high quality images, and consume minimal power.

The LCD device is particularly popular in the current market because of its lower cost. The LCD device generally includes a color filter substrate, a thin film transistor (TFT) substrate, and a liquid crystal layer sandwiched therebetween. A common electrode layer and a plurality of pixel electrodes are provided on the color filter substrate and the TFT substrate, respectively. Each pixel electrode, a part of the common electrode layer and liquid crystal molecules of the liquid crystal layer sandwiched therebetween form a liquid crystal capacitor. The liquid crystal molecules sandwiched between the common electrode layer and the pixel electrodes obtain different rotation angles under control of electric fields generated by signals provided to the common electrode layer and the pixel electrodes. Thus the LCD panel displays different gray levels at different pixels, with the pixels collectively forming an image viewed by a user.

To meet user requirements of intuition and convenience, various types of LCD with touch control function have been developed for display devices. In particular, there are in-cell touch display devices and out-cell touch display devices. The in-cell touch display device has attracted much attention. The out-cell touch display device requires an additional touch panel for detecting contact. The in-cell touch display device provides touch control function built into the LCD cell. No additional touch panel is required, and thus the in-cell touch display device has advantages of light weight, compactness and high optical performance Most of the in-cell touch type display panels belong to the optical sensation type which has photo sensors formed at a same substrate with a TFT unit. That is, the photo sensors are provided at the TFT substrate. Each photo sensor serves as a detection element, and can for example be a diode or a transistor.

However, each detection element of the in-cell touch display device occupies a part of a corresponding pixel. In such pixel, the size of the pixel electrode is less than that of other pixel electrodes in other pixels. As a result, the capacitance of the liquid crystal capacitor formed in the pixel having the detection element is different from that of the liquid crystal capacitor in any other pixel not having a sensing element. Thus, when a scanning signal applied to the pixels changes between a high level signal and a low level signal, feed-through voltages of the pixels cannot be maintained constant, and flickering of the displayed image is generated. In addition, the above phenomenon not only occurs in the in-cell touch display device, but also occurs in other display devices that have pixel electrodes with different areas.

What is needed, therefore, is a display device that can overcome the above-described deficiencies.

SUMMARY OF THE INVENTION

According to one aspect of the present disclosure, there is provided an exemplary embodiment of a display device. A display device, such as a display device having touching sensing elements, includes a plurality of scanning lines, a plurality of data lines intersect with the scanning lines thereby defining a plurality of sub-pixel units. Each sub-pixel unit includes a pixel electrode, a storage capacitor, and a compensation capacitor connected between the pixel electrode and a corresponding scanning line. The storage capacitor electrode, the pixel electrode and an insulating layer sandwiched therebetween form a storage capacitor. In each pixel unit defined by n number adjacent sub-pixel units, both of a ratio of capacitance values between the storage capacitors formed in the corresponding sub-pixel units and a ratio of capacitance values between the corresponding compensation capacitors are respectively substantially equal to a ratio of areas between the corresponding pixel electrodes.

According to another aspect of the present disclosure, there is provided an exemplary embodiment of a display device. A display device, such as a display device having touching sensing elements, includes a plurality of liquid crystal molecules, a plurality of scanning lines, a plurality of data lines intersect with the scanning lines thereby defining a plurality of sub-pixel units. Each sub-pixel unit includes a pixel electrode, a common electrode, a storage capacitor, and a compensation capacitor connected between the pixel electrode and a corresponding scanning line, where the common electrode, the pixel electrode and the liquid crystal molecules sandwiched therebetween forming a liquid crystal capacitor, and the storage capacitor connected in parallel to the liquid crystal capacitor. In each pixel unit defined by n number adjacent sub-pixel units, at least one of a ratio of capacitance values between the storage capacitors formed in the corresponding sub-pixel units and a ratio of capacitance values between the corresponding compensation capacitors are respectively substantially equal to a ratio of areas between the corresponding pixel electrodes.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
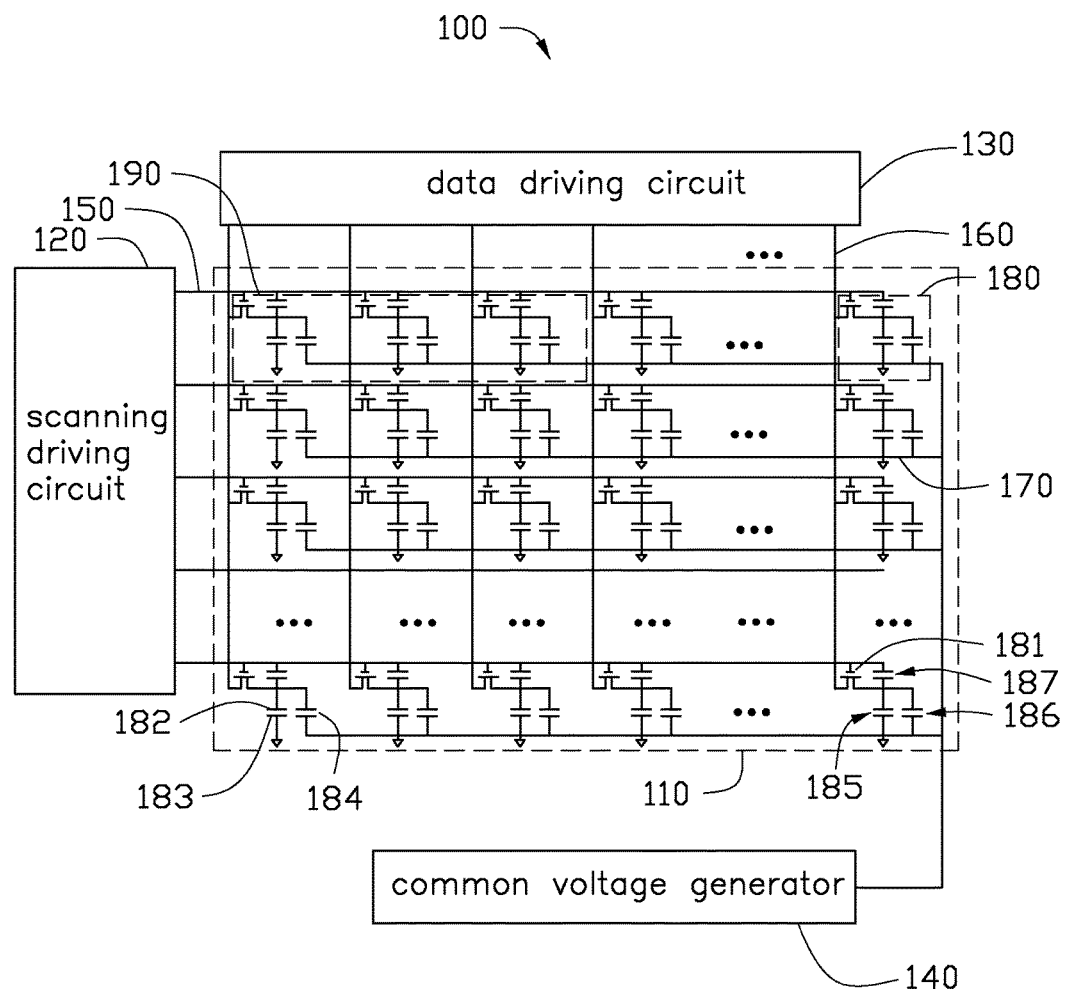
FIG. 1 is an abbreviated equivalent circuit diagram of a first embodiment of a display device of the present disclosure, the display device including a plurality of sub-pixel units, with each three adjacent sub-pixel units forming a pixel unit.

Referring to FIG. 1, an equivalent circuit of a display device 100 according to an embodiment of the present disclosure is shown. The display device 100 includes a display panel 110, a scanning driving circuit 120, a data driving circuit 130, and a common voltage generator 140. In the exemplary embodiment, the display device 100 is an in-cell liquid crystal display device.

The display panel 110 includes a plurality of scanning lines 150 arranged parallel to each other and each extending along a first direction, a plurality of data lines 160 arranged parallel to each other and each extending along a second direction perpendicular to the first direction, and a plurality of common lines 170 arranged parallel to each other with each common line 170 disposed between two adjacent scanning lines 150. Thus the data lines 160 intersect with the scanning lines 150, defining a plurality of sub-pixel units 180. Each sub-pixel unit 180 includes a thin film transistor (TFT) 181, a pixel electrode 182, a common electrode 183 facing towards the pixel electrode 182, a storage capacitor electrode 184, and a compensation capacitor 187.

Each TFT 181 includes: a gate electrode (not labeled) serving as a control electrode and connected to the scanning driving circuit 120 via a corresponding scanning line 150; a first electrode, such as a drain electrode (not labeled), connected to the data driving circuit 130 via a corresponding data line 160; and a second electrode, such as a source electrode (not labeled), connected to a corresponding pixel electrode 182. In the embodiment, the source electrode overlaps the gate electrode, and the overlapping portion cooperates with an insulating layer, such as a gate insulating layer covering the gate electrode, to form a parasitic storage capacitor between the gate electrode and the source electrode. The parasitic storage capacitor serves as the compensation capacitor 187, and is connected between the corresponding scanning line 150 and the pixel electrode 182.

A common electrode layer (not shown) is located on a color filter substrate (not shown) of the display panel 110. In the equivalent circuit diagram, every portion of the common electrode layer corresponding to each sub-pixel unit is equivalent to one common electrode 183. Because a plurality of liquid crystal molecules is sandwiched between the common electrode layer and the pixel electrodes 182, the common electrode 183, the corresponding pixel electrode 182 and the liquid crystal molecules sandwiched therebetween form a liquid crystal capacitor 185. Simultaneously, the storage capacitor electrode 184 is connected to a corresponding common line 170, and more particularly, the storage capacitor electrode 184 extends from the corresponding common line 170. Because the storage capacitor electrode 184 overlaps a portion of the corresponding pixel electrode 182, the storage capacitor electrode 184, the corresponding pixel electrode 182 and an insulating layer sandwiched therebetween form a storage capacitor 186. The common electrodes 183 and the storage capacitor electrodes 184 are commonly connected to the common voltage generator 140.

The array of sub-pixel units 180 of the display panel 110 can be divided into a plurality of pixel units 190. Each pixel unit is formed by n–m adjacent sub-pixel units 180. More particularly, each pixel unit 190 is formed by three adjacent sub-pixel units 180 arranged in a row, with the three sub-pixel units 180 corresponding to three adjacent red, green and blue color units R, G, B on the opposite substrate. In at least one of the pixel units 190, an area of at least one of the pixel electrodes 182 of the corresponding sub-pixel units 180 is different from that of the pixel electrodes 182 of the other sub-pixel units 180 because of an additional electrooptics element, such as an optical sensor, arranged in the corresponding sub-pixel unit 180. Therefore, capacitance values of the storage capacitors of the corresponding sub-pixel unit 180 is less than that of the other sub-pixel units 180 in the at least one of the pixel units 190. Accordingly, either the compensation capacitors 187 or the storage capacitors 186 of the three sub-pixel units 180 have different capacitance values. For easier understanding of the following description, unless the context indicates otherwise, the display device 100 described is an in-cell touch display device. Therefore, a plurality of detection elements is provided to some of the sub-pixel units 180 respectively, and at least one of the detection elements corresponds to one of the pixel units 190.

Figure 2:
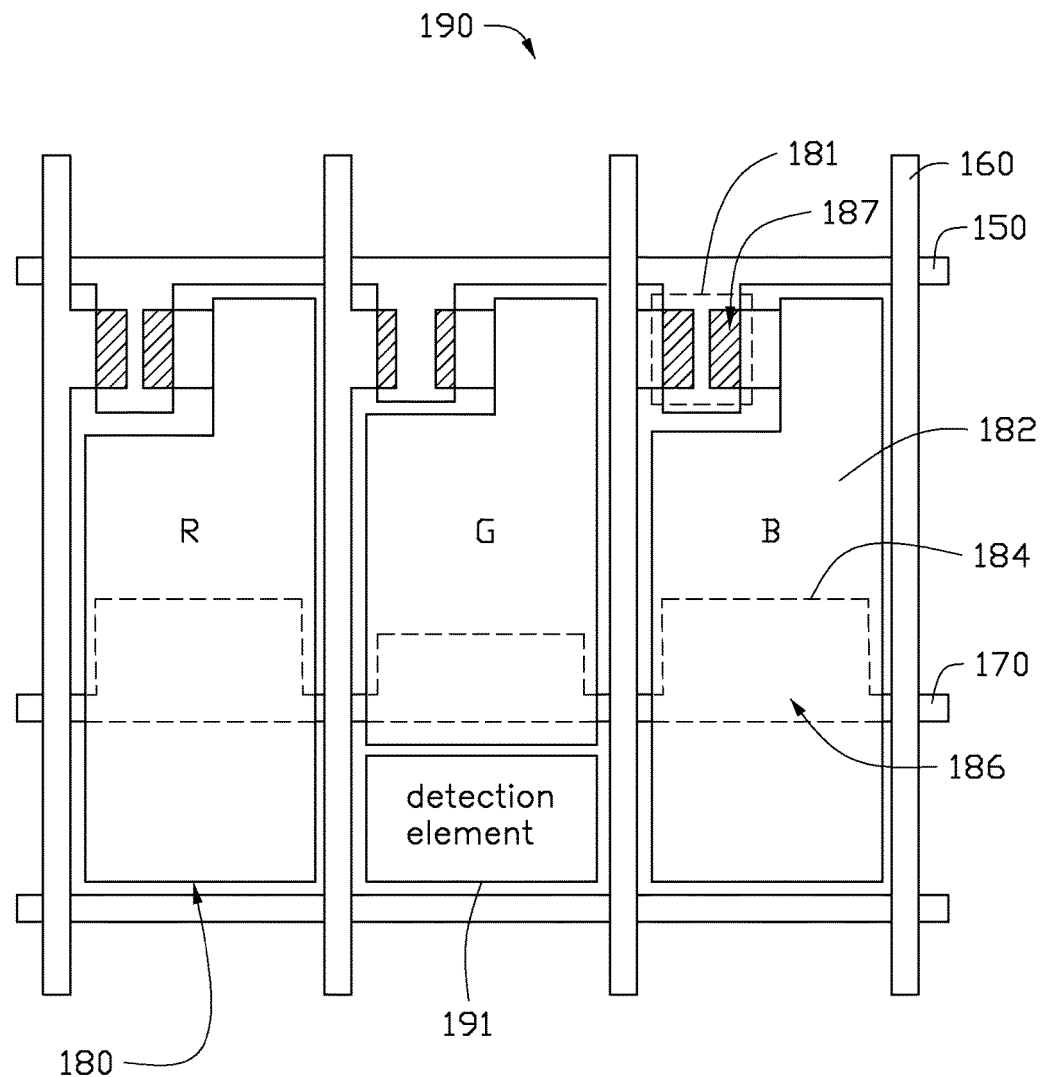
FIG. 2 is a top plan view of one of the pixel units of the display device of FIG. 1 when the display device is an in-cell touch display device.

Referring to FIG. 2, one of the pixel units 190 of the display device 100 is shown. In the embodiment, the pixel unit 190 is formed by a first, second and third sub-pixel units 180 arranged in the same row and serves as one touch sensing unit. The first, second and third sub-pixel units 180 respectively correspond to a red color unit R, a green color unit G and a blue color unit B, and are commonly connected to the same scanning line 150. A detection element 191 is provided in one of the three sub-pixel units 180, such as to the second sub-pixel unit corresponding to the green color unit, adjacent to the pixel electrode 182 of that sub-pixel unit 180. When a portion of the display device 100 where the detection element 191 is located is contacted, the detection element 191 registers the contact, generates a control signal, and sends the control signal to an external circuit. The external circuit determines coordinates of the contact location according to the control signal, generates corresponding signals, and sends the signals to the data driving circuit 130 and the scanning driving circuit 150, thereby controlling the display device 100.

The detection element 191 occupies a part of the second sub-pixel unit 180, and therefore the area of the pixel electrode 182 of the second sub-pixel unit 180 is less than that of the pixel electrode 182 in each of the first and third sub-pixel units 180. That is, the areas of the pixel electrodes 182 in the three sub-pixel units 182 satisfy the formulas S2<S1 and S2<S3, wherein S2 denotes the area of the pixel electrode 182 in the second sub-pixel unit 180, S1 denotes the area of the pixel electrode 182 in the first sub-pixel unit 180, and S3 denotes the area of the pixel electrode 182 in the third sub-pixel unit 180. If S1:S2:S3 is substantially equal to 1:x:y, a ratio of capacitance values between the liquid crystal capacitors 185 of the three sub-pixel units 180 is also substantially equal to 1:x:y.

In the embodiment, a ratio of capacitance values of the compensation capacitors 187 in the first, second and third sub-pixel units 180 is configured to be substantially equal to 1:x:y by regulating overlapped areas between the gate electrodes and the source electrodes of the corresponding TFTs 181. Further, a ratio of capacitance values of the storage capacitors 186 is also configured to be substantially equal to 1:x:y by regulating overlapped areas between the storage capacitance electrodes 184 and the pixel electrodes 182 in the first, second and third sub-pixel units 180. That is, in each pixel unit 190, the ratio of the capacitance values of the storage capacitors 186 of the first, second and third sub-pixel units 180 is substantially equal to S1:S2:S3, and the ratio of the capacitance values between the compensation capacitors 187 of the first, second and third sub-pixel units 180 is also substantially equal to S1:S2:S3.

Figure 3:
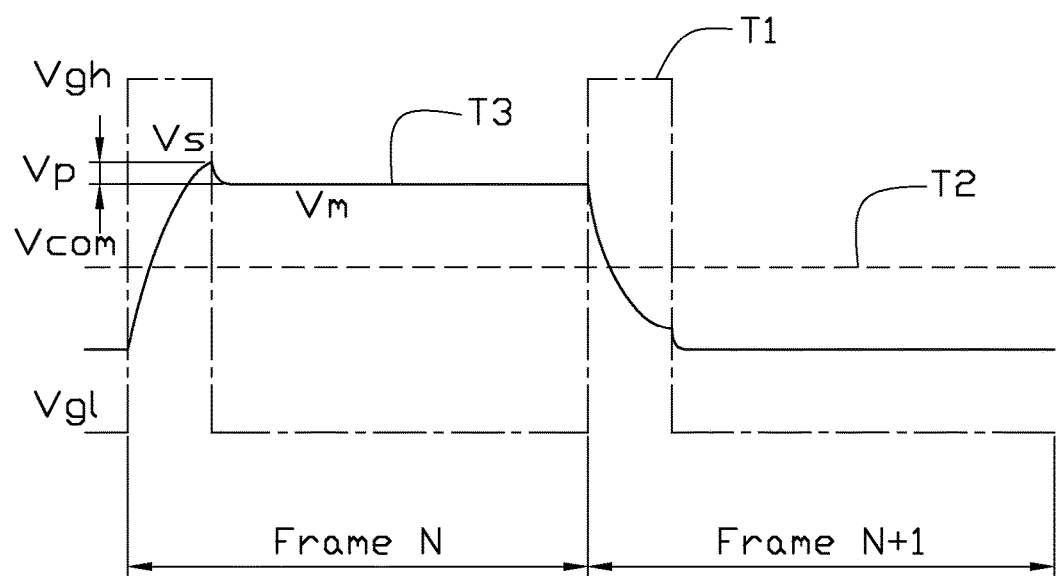
FIG. 3 is a waveform diagram of voltages applied to one of the sub-pixel units of FIG. 1 during two successive frames.

Referring to FIG. 3, waveforms of voltages applied to one sub-pixel unit 180 are illustrated. In the drawing, the dash-dot line T1 denotes a waveform of a scanning signal generated by the scanning driving circuit 120 and configured for switching on or off the TFT 181 of the sub-pixel unit 180, the broken line T2 denotes a waveform of a common voltage signal generated by the common voltage generator 140 and provided to the common electrode 183 of the sub-pixel unit 180, and the continuous line T3 denotes a waveform of a voltage value between two electrodes of the liquid crystal capacitor 185 of the sub-pixel unit 180. As shown in FIG. 3, because a polarity of the voltage value between two electrodes of the liquid crystal capacitor 185 in an Nth frame is opposite to that of the voltage value between the two electrodes of the liquid crystal capacitor 185 in an (N+1)th frame, data signals generated by the data driving circuit 130 and applied to the sub-pixel unit 180 during a period of the two adjacent frames have different polarities.

In detail, during a period of the Nth frame, a high level Vgh of the scanning signal is applied to the sub-pixel unit 180, and at the same time, the data driving circuit 130 generates a data signal to the sub-pixel unit 180 and commonly charges the liquid crystal capacitor 185. The voltage value between the two electrodes of the liquid crystal capacitor 185 increases until the scanning signal is changed from the high level Vgh to a low level Vgl. At the moment when the scanning voltage is reduced from the high level Vgh to the low level Vgl, the voltage value between the two electrodes of the liquid crystal capacitor 185 reaches a maximum voltage value Vs; and thereupon the voltage value between the two electrodes of the liquid crystal capacitor 185 is reduced to a stable voltage value Vm which corresponds to the data voltage applied to the sub-pixel unit 180, and thereupon the sub-pixel unit 180 begins to display a gray level correspond to the stable value Vm.

A difference between the maximum voltage value Vs and the stable voltage value Vm is defined as a feed-through voltage Vp of the sub-pixel unit 180. A relationship between the liquid crystal capacitor 185 and the feed-through voltage Vp is expressed in the following formula (A):

$$Vp=Cgs(Vgh-Vgl)/(Cgs+Clc+Cst) \quad (A)$$

wherein Clc, Cst, and Cgs denote capacitance values of the liquid crystal capacitor 185, the storage capacitor 186 and the compensation capacitor 187 respectively, and the difference in voltage values (Vgh–Vgl) usually remains constant.

In each pixel unit 190 of the display device 100 which has a detection element 191 provided therein, because both the ratio of the capacitance values of the storage capacitors 186 of the three sub-pixel units 180 and the ratio of the capacitance values of the compensation capacitors 187 of the corresponding sub-pixel units 180 are substantially equal to the ratio of the areas of the corresponding pixel electrodes 182, the feed-through voltage Vp is capable of maintaining a constant value according to the above formula (A). As a result, any image flickering that may otherwise exist can be reduced or even eliminated, and a display quality of the display device 100 is improved.

In an alternative embodiment, at least one extending portion extending from a corresponding scanning line serves as a storage capacitor electrode of the storage capacitor. The at least one extending portion cooperates with a portion of the pixel electrode facing towards the at least one extending portion and with an insulating layer sandwiched between the at least one extending portion and the portion of the pixel electrode to form an overlapping-type storage capacitor.

It is to be understood, however, that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the disclosure to the full extent indicated by the broad general meaning of the terms in which the appended claims are expressed.

What is claimed is:

1. A display device, comprising:
a plurality of parallel scanning lines;
a plurality of parallel data lines intersecting with the scanning lines thereby defining a plurality of sub-pixel units, each sub-pixel unit comprising:
a pixel electrode;
a storage capacitor electrode, the storage capacitor electrode, the pixel electrode and an insulating layer sandwiched therebetween forming a storage capacitor; and
a compensation capacitor connected between the pixel electrode and a corresponding scanning line;
wherein a pixel unit comprises a plurality of sub-pixel units, and the plurality of sub-pixel units comprise a first sub-pixel unit and a second sub-pixel unit, an area of the pixel electrode of the second sub-pixel unit is smaller than an area of the pixel electrode of the first sub-pixel unit, and a capacitance value of the storage capacitor of the second sub-pixel unit is smaller than a capacitance value of the storage capacitor of the first sub-pixel unit, and a capacitance value of the compensation capacitor of the second sub-pixel unit is smaller than a capacitance value of the compensation capacitor of the first sub-pixel unit.

2. The display device of claim 1, wherein each sub-pixel unit further comprises a thin film transistor, and the thin film transistor comprises a gate electrode, a first electrode and a second electrode, which are connected to a corresponding scanning line, a corresponding data line and a corresponding pixel electrode, respectively.

3. The display device of claim 2, wherein each compensation capacitor is formed by a corresponding gate electrode, the second electrode facing towards the gate electrode, and an insulating layer sandwiched between the gate electrode and the second electrode.

4. The display device of claim 1, wherein the number N of sub-pixel units of each pixel unit are connected to the same scanning line.

5. The display device of claim 4, further comprising a color filter layer, wherein the number N of sub-pixel units correspond to a red color unit, a green color unit and a blue color unit of the color filter layer.

6. The display device of claim 1, wherein for the at least one sub-pixel unit that comprises the pixel electrode having an area different from the area of the pixel electrode of at least one other sub-pixel unit, such at least one sub-pixel unit further comprises a detection element configured to generate a control signal when such at least one sub-pixel unit is touched.

7. The display device of claim 6, wherein the detection element is located adjacent to the pixel electrode of such at least one sub-pixel unit.

8. The display device of claim 1, wherein the storage capacitor electrode is formed by at least one extending portion extending from a corresponding scanning line.

9. The display device of claim 1, further comprising a plurality of common lines arranged parallel to each other, wherein each common line is located between two adjacent scanning lines, and the storage capacitor electrode extends from a corresponding common line.

10. A display device, comprising:
a plurality of liquid crystal molecules;
a plurality of parallel scanning lines;
a plurality of parallel data lines intersecting with the scanning lines thereby defining a plurality of sub-pixel units, each sub-pixel unit comprising:
a pixel electrode;
a common electrode, the common electrode, the pixel electrode and the liquid crystal molecules sandwiched there between forming a liquid crystal capacitor;
a storage capacitor connected in parallel to the liquid crystal capacitor; and
a compensation capacitor connected between the pixel electrode and a corresponding scanning line;
wherein a pixel unit comprises a first sub-pixel unit and a second sub-pixel unit, an area of the pixel electrode of the second sub-pixel unit is smaller than an area of the pixel electrode of the first sub-pixel unit, and a capacitance value of the storage capacitor of the second sub-pixel unit is smaller than a capacitance value of the storage capacitor of the first sub-pixel unit, and a capacitance value of the compensation capacitor of the second sub-pixel unit is smaller than a capacitance value of the compensation capacitor of the first sub-pixel unit.

11. The display device of claim 10, wherein each sub-pixel unit further comprises a thin film transistor, and the thin film transistor comprises a controlling electrode, a first electrode and a second electrode, which are connected to a corresponding scanning line, a corresponding data line and a corresponding pixel electrode, respectively.

12. The display device of claim 11, wherein each compensation capacitor is formed by a corresponding controlling electrode, the second electrode facing towards the gate electrode and an insulating layer sandwiched each other.

13. The display device of claim 10, wherein the N number sub-pixel units of each pixel unit are connected to the same scanning line.

14. The display device of claim 13, wherein the N number sub-pixel units correspond to a red color unit, a green color unit and a blue color unit of a color filter layer applied to the display device.

15. The display device of claim 10, wherein in each pixel unit, at least one sub-pixel unit comprises a detection element configured to generate a control signal when the at least one sub-pixel unit is touched.

16. The display device of claim 15, wherein the detection element is located adjacent to the pixel electrode of the at least one sub-pixel unit.

17. The display device of claim 10, wherein in each sub-pixel unit, a storage capacitor electrode of the storage capacitor extends from a corresponding scanning line, and cooperates with the pixel electrode facing towards the storage capacitor electrode and an insulating layer sandwiched between the pixel electrode and the storage capacitor electrode to form the storage capacitor.

18. The display device of claim 10, further comprising a plurality of common lines arranged parallel to each other and each common line located between two adjacent scanning lines, wherein a storage capacitor electrode of each storage capacitor extends from a corresponding common line, and cooperates with a corresponding pixel electrode and an insulating layer sandwiched between the corresponding common line and the corresponding pixel electrode to form the storage capacitor.

19. A display device, comprising:
a plurality of pixel units each defined by a predetermined number N of adjacent sub-pixel units, at least one of the pixel units comprising a detection element configured to generate a control signal when the at least one pixel unit is touched, and each sub-pixel unit comprising:
a pixel electrode;
a storage capacitor; and
a compensation capacitor;
wherein in the at least one pixel unit having the detection element, the detection element is provided in a green color unit of the sub-pixel units and the size of the pixel electrode of the green color unit is correspondingly reduced, and a capacitance value of the storage capacitor of the green color unit is smaller than capacitance values of the storage capacitors of the other sub-pixel units of the predefined number N of the sub-pixel units, and a capacitance value of the compensation capacitor of the green color unit is smaller than capacitance values of the compensation capacitors of the other sub-pixel units.

* * * * *